United States Patent [19]
Ardolino

[11] Patent Number: 5,265,239
[45] Date of Patent: Nov. 23, 1993

[54] METHOD FOR REMOTELY ACCESSING SERVICE PROGRAMS OF A LOCAL PROCESSING SYSTEM SUPPORTING MULTIPLE PROTOCOL STACKS AND MULTIPLE DEVICE DRIVERS

[76] Inventor: Anthony A. Ardolino, 2435 Trappe Ave., Miami, Fla. 33133

[21] Appl. No.: 681,948

[22] Filed: Apr. 8, 1991

[51] Int. Cl.⁵ .......................... G06F 9/06; G06F 9/455
[52] U.S. Cl. ..................................... 395/500; 395/725; 364/239.4; 364/240.8; 364/284; 364/940.81; 364/232.3
[58] Field of Search .................... 395/500, 725, 200

[56] References Cited

U.S. PATENT DOCUMENTS

| | | | |
|---|---|---|---|
| 4,493,021 | 1/1985 | Agrawal et al. | 395/200 |
| 4,754,395 | 6/1988 | Weisshaar et al. | 395/650 |
| 4,768,150 | 8/1988 | Chang et al. | 395/700 |
| 4,855,905 | 8/1989 | Estrada et al. | 395/500 |
| 4,975,829 | 12/1990 | Clarey et al. | 395/275 |
| 5,109,515 | 4/1992 | Laggis et al. | 395/725 |

OTHER PUBLICATIONS

Grygo; "TCP-IP Parade Marches On"; Digital Review Nov. 7, 1988 vol. 5 No. 21, p. 49.
Gill; "Search For the Perfect Unix User Interface"; Computer System News, No. 360, p. 56; Apr. 4, 1988.
Stephenson; "Lan Bridges: Connecting Your Lan to a World Information"; GOV Computer News, vol. 7, No. 17; p. 63.
Pompili; "TCP-IP Firms Work Toward OSA Compatibility"; PC Week, vol. 5, No. 24, PC 40; Jun. 14, 1988.
McClatchy, "Andrew Toolkit Offers Standard User Interface Across Many System"; PC Week Feb. 2, 1988, vol. 5, No. 5, p. 13.
Scott; "Operating System Gives Access to VAX.VMS, Unix"; PC Week Jun. 28, 1988, vol. 5, No. 26, PC 4.

*Primary Examiner*—Parshotam S. Lall
*Assistant Examiner*—Krisna Lim
*Attorney, Agent, or Firm*—David H. Judson

[57] ABSTRACT

A method is described for enabling one or more external processing systems to access service programs of the local processing system, the local processing system having an operating system kernel and supporting multiple protocol stacks and multiple hardware device drivers. The method begins by generating a master control structure for each compatible protocol stack and device driver supported in the local processing system. The hardware device drivers are then monitored for receipt, from an external processing system, of any requests to access the service programs. Upon receipt by a protocol stack/device driver pair of an access request for one of the service programs, the master control structure is cloned into a control structure (DCB) for that service program, the resulting service program control structure including control information to associate the service program with the protocol stack/device driver pair receiving the access request. Then, the method creates a virtual circuit representing a communication path between the external processing system, the protocol stack/device driver pair receiving the access request, and the service program. A control block (NCB) is then generated for each predetermined block of actual data to be communicated to and from the service program. The service program control structure and the virtual circuit are maintained while actual data is communicated between the service program, the protocol stack/device driver pair and the external processing system.

17 Claims, 2 Drawing Sheets

METHOD FOR REMOTELY ACCESSING SERVICE PROGRAMS OF A LOCAL PROCESSING SYSTEM SUPPORTING MULTIPLE PROTOCOL STACKS AND MULTIPLE DEVICE DRIVERS

TECHNICAL FIELD

The present invention relates generally to methods and systems for integrating diverse computer systems and more particularly to a method for enabling one or more external processing systems to transparently access service programs of a local processing system.

BACKGROUND OF THE INVENTION

The UNIX ® System was designed in the 1970's as a general purpose, multiuser, interactive operating system for minicomputers. The communications environment in UNIX is designed around a simple character input/output interface mechanism. This mechanism, which processes one character at a time, is thus unable to effectively support a broad range of devices, speeds, modes and protocols, such as the current generation of networking protocols exemplified by Systems Network Architecture (SNA), Transmission Control Protocol/Internet Protocol (TCP/IP) and Xerox Network Systems (XNS). Such protocols provide significant functionality and features but cannot be efficiently integrated for use with the UNIX operating system due to the lack of a standard interface.

There have been attempts to solve this problem through the development of special tools such as AT&T's STREAMS, which is a collection of system calls, kernel resources and kernel utility routines that define standard interfaces for character input/output within the UNIX kernel, and between the kernel and the rest of the UNIX System. The STREAMS mechanism is described in the UNIX System V/386 Release 3.2 Streams Primer (1989). The Berkeley Standard Distribution ("BSD") form of the UNIX kernel has a similar mechanism commonly referred to Berkeley Sockets.

Conceptually, AT&T's STREAMS and Berkeley Sockets support development of interface standards for character input/output within the UNIX kernel, and between the kernel and the user level. Unfortunately, these tools have not been effectively developed to the extent necessary to enable the UNIX operating system to be interconnected and integrated with existing diverse networks. The many desirable features and characteristics of the UNIX System therefore have not been available to users of PC's and local area networks because of this connectivity problem.

It would therefore be desirable to provide a method of integrating a multiuser, interactive operating system such as UNIX with other computing systems, networks, applications and information.

BRIEF SUMMARY OF THE INVENTION

It is an object of the present invention to provide a method and system supported on a multiuser operating system such as UNIX that is transparently integrated with other diverse computing systems.

It is a more specific object of the present invention to provide a method, using a local processing system having an operating system kernel and supporting multiple protocol stacks and multiple hardware device drivers, for enabling one or more external processing systems to access service programs of the local processing system in a transparent manner.

It is another object of the invention to provide a method in which a multiuser operating system functions as a server providing file, applications and peripheral access to and from diverse local area networks such as Novell Netware, OS/2 LAN Manager, NETBIOS and TCP/IP-NFS.

According to the method of the present invention, certain data control structures are created to enable the local processing system to identify what service program is being accessed in the operating system kernel and where data from that service program needs to be communicated at the hardware level. Multiple different kinds of service programs can thus be multiplexed to multiple different kinds of protocols on multiple different kinds of hardware drivers. The result is a "server" that is transparent to a network operating system, thus functionally a "clone" of all existing network servers such as Banyan, Novell and Lan Manager.

It is yet a further important feature of the invention to implement the above-identified method using a "dual personality" interface between the service programs and the protocol stacks and between the protocol stacks and the hardware level. Each such interface supports both STREAMS and Berkeley Sockets calls. This architecture is extremely advantageous because it enables service programs written for the BSD environment to be compiled and run unmodified in the UNIX environment, and vice versa.

It is still another object of the invention to implement connection-oriented service at the device driver level for a UNIX-based local processing system.

In the preferred embodiment, these and other objects of the invention are provided in a method, using a local processing system having an operating system kernel and supporting multiple protocol stacks and multiple hardware device drivers, for enabling one or more external processing systems to access service programs of the local processing system. The method comprises the steps of first generating a master control structure for each compatible protocol stack and device driver supported in the local processing system, the master control structure for each protocol stack/device driver pair including control information to facilitate data transfer to and from the protocol stack associated with that protocol stack/device driver pair. Thereafter, the hardware device drivers are monitored for receipt, from an external processing system, of any requests to access the service programs. Upon receipt by a protocol stack/device driver pair of an access request for one of the service programs, the master control structure is cloned into a control structure (DCB) for that service program, the resulting service program control structure including control information to associate the service program with the protocol stack/device driver pair receiving the access request.

The method then continues by creating a "virtual circuit" representing a communication path between the external processing system, the protocol stack/device driver pair receiving the access request, and the service program. A virtual control block (VCB) is also created for the virtual circuit. The VCB points to or references the relevant hardware interface at which the access request was received. A control block (NCB) is then generated for each predetermined block of actual data to be communicated to and from the service program. The control block includes a data portion and information identifying the service program control structure for the service program. Each block or "packet" of data points to a DCB, and each DCB refers to a VCB for the virtual circuit. The method maintains the service program control structure and the virtual circuit while actual data is communicated between the service program, the protocol stack/device driver pair and the external processing system. During such data communication, the data portion of each control block is transmitted over the virtual circuit. Upon completion of the data communication, the service program control structure and the virtual circuit (and its corresponding VCB) are terminated.

The method also advantageously implements connection-oriented service at the datalink layers. Every data packet to be transmitted from the local processing system in response to the access request is sent from the service program down to the hardware level with just an address identifying the original source of the request (i.e., the external processing system device). If the address does not identify an existing connection, the connection is still established automatically. If the address does identify an existing connection, the connection identifier for the existing connection is retrieved and the packet is transmitted on that number. A unique hash algorithm is used to increase the speed at which connection identifiers for existing connections are retrieved.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
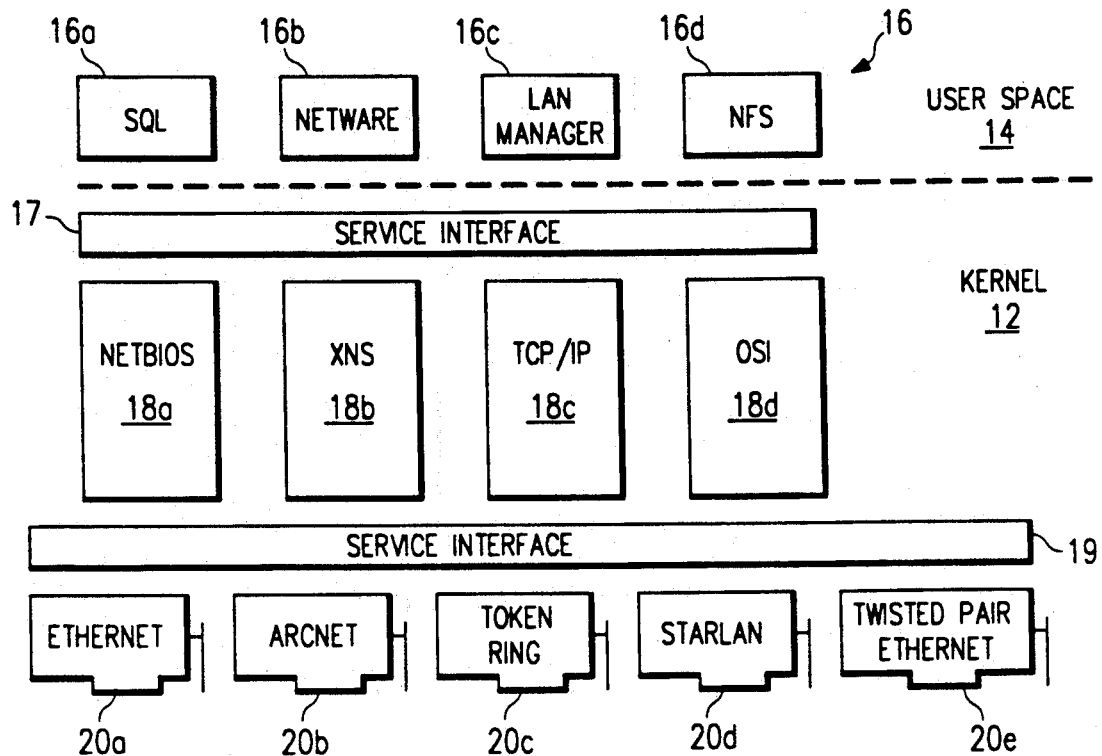
FIG. 1 is a schematic block diagram of a local processing system supporting multiple protocol stacks and multiple hardware device drivers according to present invention.

FIG. 1 illustrates the basic architectural design of a local processing system 10 incorporating the principles of the present invention. Local processing system 10 includes an operating system kernel 12 and a user space 14 supporting a plurality of service programs 16. Service programs 16 provide various types of user services such as file access and print functions. According to the invention, the operating system kernel 12 supports multiple protocol stacks 18 and multiple hardware device drivers 20. In one embodiment of the invention, the service programs 16 interface to the protocol stacks 18 via calls to an interface or "transport" layer 17. Likewise, the protocol stacks 18 interface to the device drivers through an interface layer 19. In an alternate embodiment of the invention described below in connection with FIG. 4, the transport layers 17 and 19 support multiple different types of interfaces (e.g., UNIX System V or Berkeley Sockets).

Although not meant to be limiting, preferably the local processing system 10 is a multiuser computer processing system such as a standard 386 or 486 personal computer (PC) running SCO UNIX. The service programs include for example SQL 16a, NETWARE 16b, LAN Manager 16c, NFS (Network File System) 16d, and FTAM (OSI) 16e. The protocol stacks 18 include for example the protocols: NETBIOS 18a, XNS 18b, TCP/IP 18c and OSI 18d. The hardware device drivers interconnect to Ethernet 20a (ISO specification 802.3), ArcNet 20b (ISO specification 802.4), token ring 20c (ISO specification 802.5), Starlan 20d and twisted pair Ethernet 20e.

According to the invention, the local processing system 10 includes appropriate software for enabling one or more external processing systems 22a–22e to access the service programs 16 in a transparent manner. The software thus provides "interoperability" to the external processing systems 22 by enabling the local processing system, e.g., a PC running UNIX SCO, to act as a server providing file, applications and peripheral access to and from the diverse local area networks interconnected to these systems. By way of example, workstation users supported on an external processing system 22 can gain transparent access to UNIX files, applications and facilities from the workstation's native environment.

Figure 2:
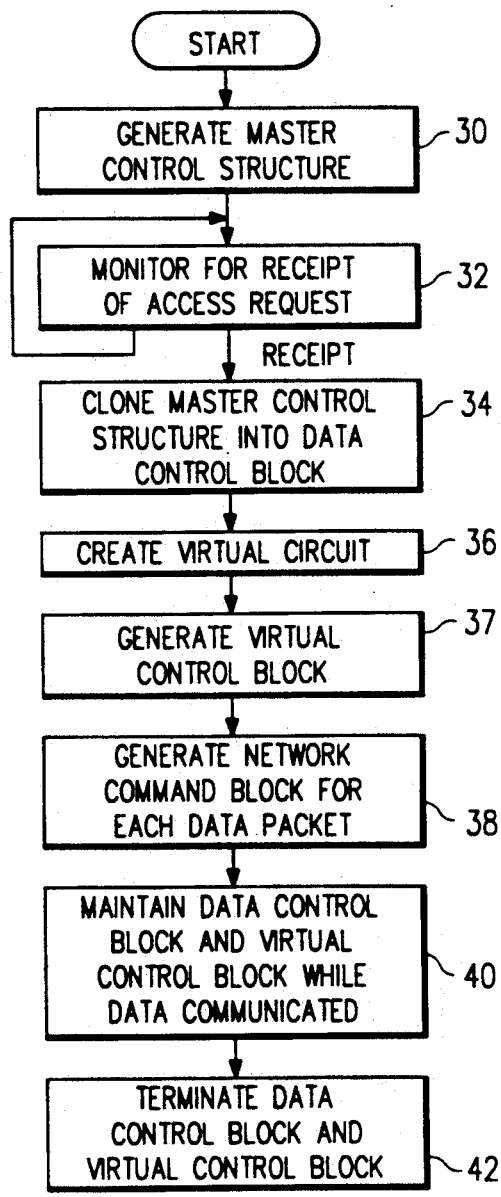
FIG. 2 is a flowchart diagram of a preferred method of the present invention for enabling an external processing system to access one of the service programs of the local processing system of FIG. 1.

Referring now to FIG. 2, a flowchart diagram is shown of a preferred embodiment of a method of the present invention for enabling the multiple external processing systems to transparently access the service programs of the local processing system. The method begins at step 30 wherein a master control structure is first generated for each compatible protocol stack 18 and device driver supported in the local processing system. The master control structure for each protocol stack/device driver pair including control information to facilitate data transfer to and from the protocol stack associated with that protocol stack/device driver pair. Thereafter, at step 32, the hardware device drivers are monitored for receipt, from an external processing system 22, of any requests to access the service programs 16. Upon receipt by a protocol stack/device driver pair of an access request for one of the service programs, the method continues at step 34 by cloning the master control structure into a control structure (DCB) for that service program. The service program control structure that results from step 34 includes control information to associate the service program with the protocol stack/device driver pair receiving the access request.

The method then continues at step 36 by creating a so-called "virtual circuit" representing a communication path between the external processing system 22, the protocol stack/device driver pair receiving the access request, and the necessary service program 16. At step 37, a virtual control block (VCB) is created for the virtual circuit. A network command block (NCB) is then generated at step 38 for each predetermined block of actual data to be communicated to and from the service program 16. The NCB includes a data portion and information identifying the service program control structure (DCB) for the service program. Each packet of data sent to or from the service program points to a DCB for the service program and each DCB has a virtual circuit identification number of "vcid" that refers to a VCB for the virtual circuit. The VCB itself points to the hardware interface.

Referring back to FIG. 2, the method continues at step 40 wherein the service program control structure and the virtual circuit constructs are maintained while actual data is communicated between the service program, the protocol stack/device driver pair and the external processing system. During such data communication, the data portion of each control block is transmitted over the virtual circuit. Upon completion of the data communication, the service program control structure and the virtual circuit (and its corresponding VCB) are terminated as indicated at step 42.

Therefore, according to the method of the present invention, the above-identified control structures are created to enable the local processing system to identify what service program is being accessed in the operating system kernel and where data to/from that service program needs to be communicated at the hardware level. This operation is carried out for each connection that is established, i.e., for each access request. Multiple different kinds of service programs can thus be multiplexed to multiple different kinds of protocols on multiple different kinds of hardware drivers. The result is a "server" that is transparent to a network operating system, thus functionally a "clone" of all existing network servers such as Banyan, Novell and Lan Manager. In effect, the local processing system acts as the interface between various different types of networks. With multiple service programs and multiple external processing systems, the method facilitates interoperability between normally heterogeneous computer systems irregardless of the user's current operating environment.

As stated above, the method generates a service program control structure or DCB that includes control information to associate the service program with the protocol stack/device driver pair receiving the access request. The DCB includes all information that the service program will need during the transaction, i.e., the use of the service program to comply with the access request. The preferred format of the DCB is set forth below:

| DATA CONTROL BLOCK | |
|---|---|
| struct NB_dcb | |
| mblk_t *nd_mblk; | /* Mblk to be freed */ |
| mblk_t *nd_dataq; | /* data before conndone */ |
| queue_t *nd_rdq; | /* read q to send pkts */ |
| struct nbaddr nd_faddr; | /* Foreign address */ |
| struct nbaddr nd_laddr; | /* Local address */ |
| struct NB_dcb *nd_head; | /* Head of queue */ |
| struct NB_dcb *nd_cq; | /* Connection queue */ |
| char *nd_listenncb; | /* Listen-NCB for cancel */ |
| mblk_t *nd_iocbp; | /* ioctl blk */ |
| unsigned long nd_opackets; | /* Number of out packets */ |
| unsigned long nd_ipackets; | /* Number of in packets */ |
| short nd_maxcon; | /* Maximum number */ |
| short nd_seqnum; | /* Sequence number */ |
| short nd_qlen | /* Qlen of connections */ |
| short nd_minordev; | /* Minor device num */ |
| short nd_state; | /* TLI state of dev */ |
| short nd_flags; | /* Info about dev */ |

| -continued | |
|---|---|
| DATA CONTROL BLOCK | |
| short nd_req; | /* TLI req in err */ |
| short nd_err; | /* TLI err to send up */ |
| short nd_magic; | /* Sanity check */ |
| short nd_vcid; | /* vcid to use later */ |
| short nd_nameid; | /* Name number */ |
| short nd_pid; | /* Pid of process */ |

As noted above, each block of data (e.g., a call, a call response, a connect request, a connect response, or actual data such as the results of a file copy) transmitted to or received by the service program points to a DCB having the above-identified data fields. The DCB provides the kernel all the information needed to facilitate connections to/from a service program. The information includes a number of identifiers. Referring now to the above description, the identifier "pid" is the service program identifier. The "nameid" is the index into a name table. Each computer on the network is given a name. Upon system initiation, the local processing system's name is registered in the table; thereafter, names of remote computers are registered as connections are established. The identifier "vcid" is the identifier for the virtual circuit created at step 36 of the method. The identifier "err" stores any error currently reported that can then be sent up to the upper layer; the identifier "req" stores errors that occur in the upper layer that are sent downward. The "flags" field identifies the type of interface. The "state" field identifies the state of the interface, e.g., open, closed, data transfer. The identifier "minordev" is the actual physical device number connected to the service program. "Qlen" is the queue length identifying the maximum number of outstanding connection requests that can be supported at one time. The "seqnum" is the sequence number of the pending connections. "Maxcon" is the maximum number of simultaneous connections.

The fields "ipackets" and "opackets" reflect the number of in and out packets for use in statistical reporting. The identifier "iocbp" refers to the input/output control block that the DCB point to. "Listenncb" is the pointer to the NCB that is listening. The identifier "cq" defines the connection queue, whose head is defined by the "head" identifier. The field "laddr" identifies the local network address; "faddr" is the remote network address. The identifier "rdq" is the read queue that data comes in on. "Dataq" is the data queue where data is stored before connection is completed. "Mblk" is the actual message block for the communication.

The VCB is created for each virtual circuit, and is found by the "vcid" in the DCB. As discussed above, the VCB itself specifically points to the structure referring to the hardware. The preferred format of the VCB is set forth below:

| VIRTUAL CONTROL BLOCK | |
|---|---|
| typedef struct vcb | |
| NAMCB far *namcb; | /* ptr to name table entry */ |
| BYTE rname[16]; | /* remote name */ |
| TIMER wdtimer; | /* watchdog timer */ |
| BYTE rpadr[6]; | /* address at other end */ |
| NCB far *ctl_ncb; | /* calls and hangups */ |
| WORD lbsendp; | /* 0: no loopback'd send pending */ |
| | /* 1: loopback send pending but */ |
| | /* delaying because no recvr */ |

-continued

| VIRTUAL CONTROL BLOCK | |
|---|---|
| NCB far *rv_ncbhead; | /* pending receives */ |
| TIMER rv_timer; | /* receive timer */ |
| WORD rv_already_used; | /* bytes used in next recv msg */ |
| WORD rv_bufused; | /* bytes already rcvd into rv ncb */ |
| NCB far *sn_ncbhead; | /* pending sends */ |
| TIMER sn_timer; | /* send timer ** also used for call resp ** |
| WORD sn_sent; */ | /* bytes last sent for sn ncb |
| WORD sn_acked; | /* bytes sent and acked for sn ncb */ |
| BYTE vcid; | /* circuit id that user sees |
| BYTE state; | /* VSTATEfree,call,hangup, active,hpend */ |
| BYTE flags | /* flag bits,VFLAGcaller and loopback */ |
| BYTE nameid; | /* index to name table */ |
| BYTE hangupsts; | /* hangup sts when state = hpend */ |
| BYTE wdcount; | /* decremented when wdtimer expires */ |
| | /* reloaded when packet received */ |
| BYTE rto; | /* receive timeout, ½ sec incs */ |
| BYTE sto; | /* send timout, ½ sec incs */ |
| BYTE rvcid; | /* vcid that remote end uses */ |
| BYTE rv_seq; | /* recv expected seq # — 0 or 0×10 */ |
| BYTE sn_time; | /* total time elapsed attempting send */ |
| | /* ** also used for call retry counter ** * |
| BYTE sn_seq; | /* send seq # — 0 or 0×10 */ |
| struct NB_ifnet* | |

The pointer "namcb" points to a name control block identifying the name of the local processing system. Byte "rname" is the name of the remote machine that the local processing system is communicating with. Each virtual circuit has a timer associated therewith; the "wdtimer" is a watchdog timer which is restarted with each new packet. If the time times out, the virtual circuit is terminated. The byte "rpadr" is the network address of the remote computer. The "ctl_ncb" is a control network command block established for the virtual circuit to monitor calls and hangups. The "lbsendp" field is a flag indicating whether or not the virtual circuit defines a loopback within the local processing system (for testing purposes) or an external connection. The pointer "rv_ncbhead" is a pointer to a head of a linked list of NCB's posted to receive incoming data packets. Likewise, the pointer "sn_ncbhead" points to the head of a linked list of pending NCB's waiting to be sent.

When a message is lengthy, it must be fragmented and thus the system needs to keep track of data blocks so that the data can be properly reassembled later. The "rv_timer" starts when a data block of a fragmented message is received. The "sn timer" starts upon transmission of a data block; if an acknowledgement is not received before it times out, the data block is resent. The "sn_sent" and "sn_acked" fields indicate the number of bytes sent and how many of such bytes were acknowledged, respectively. The byte "vcid" is the circuit identifier that the user sees. The byte "state" identifies the state of the virtual circuit, namely: free, call, hangup, active or hangup pending. The "flags" field includes the bit flags indicating whether the virtual circuit is in a loopback or test mode or reflects an outgoing connection. The "nameid" is the index to the name table. The byte "hangupsts" determines if there is a hangup pending. The byte "wdcount" represents the count that is started by the "wdtimer". The "rto" and "sto" bytes are the timeout parameters.

The "rvcid" field identifies the "vcid" of the remote processing system. When packets are transmitted or received, each packet is sequenced (with a "0" or "1") so that the sequence of the packets can be verified. The byte "rv_seq" is the sequence bit of a received packet; likewise, "sn_seq" is the sequence bit for a transmitted packet. The "sn_time" field is a count of the total elapsed time waiting for an acknowledgement for a transmitted packet. Finally, the "NB ifnet" pointer points to the specific hardware device connected.

Each remote processing system has at least one device driver and protocol stack. The remote system generates the network command blocks and virtual control blocks as required to facilitate the transmission.

As discussed above, each data packet delivered to or from the service program is associated with an NCB. The preferred format for this structure is set forth below:

| NETWORK COMMAND BLOCK | |
|---|---|
| typedef struc ncb | |
| BYTE cmd; | /* command code */ |
| BYTE err; | /* error return */ |
| BYTE vcid; | /* session id */ |
| BYTE namenum; | /* name number */ |
| char *bufptr; | /* buffer address */ |
| short buflen; | /* buffer length */ |
| BYTE rname[NBNAMSZ]; | /* remote name */ |
| BYTE lname[NBNAMSZ]; | /* local name */ |
| BYTE rto; | /* receive timeout */ |
| BYTE sto; | /* send timeout */ |
| void (*anrptr) ( ); | /* anr entry */ |
| unsigned char lana; | /* adapter number */ |
| unsigned char done; | /* cmd complete when not ff */ |
| struct ncb far *next; | /* (*) next on list */ |
| struct ncb far *canncb; | /* (*) cancel ncb for this ncb */ |
| /* */ | |
| short fromdoncb; | /* Nozero if from doncb */ |
| mblk_t *mblk; | /* Mblk to free for this */ |
| mblk_t *dblk; | /* Data Mbuf in this ncb */ |
| struct NB_dcb *dcb; | /* DCB for this NCB */ |

The upper portion of the NCB (above the last four lines) is similar to the network command block structure of NETBIOS. For example, the byte "cmd" is a one-byte field that contains the command to be executed. The "err" byte identifies any error code returned. The "vcid" byte identifies the virtual circuit. The identifier "*bufptr" is a four byte field that contains a pointer to a buffer. The identifier "buflen" contains the number of bytes stored in the buffer pointed to by the *bufptr field. For receive commands, the number is the actual number of bytes received; for transmission commands, the number is the number of bytes to send. The "rname" is the name of the remote machine; the "lname" is the name of the local processing system (and corresponds to the "nameid" in the DCB). The "char_lana" is the card number of the hardware device in the local processing system. The flag "char_done" represents whether the command is complete or pending. The field "ncb far *next" identifies the next NCB on the linked list to be sent. The structure "ncb far *canncb" is used to cancel an NCB.

The last four identifiers are included to facilitate the method of the present invention. The identifier "fromdoncb" determines whether a data packet is coming from a STREAMS interface. According to the invention, each message may have associated therewith one or more data blocks. The field "*mblk" identifies the message and the field "*dblk" identifies the data blocks associated therewith. Most importantly, the "*dcb" associates the service program control structure or DCB with the NCB. As previously discussed, a DCB is established for each service program using the protocol stack.

Of course, each remote processing system has at least one device driver and protocol stack. The remote system generates the network command blocks and virtual control blocks as required to facilitate the transmission.

The above-identified description relates to connectivity at the transport and NETBIOS layers. In particular, the DCB and its related constructs facilitate reliable data transmission, i.e., the sending of data and the acknowledgement thereof, between the service program(s) 16, transport interface 17 and protocol stacks 18. Turning now to the hardware level, the present invention implements so-called "connection-oriented" service at the datalink layer on a UNIX-based processing system. Such service is effected by a unique routine for relating the multiple connection identifiers at the hardware level to the virtual circuit identifiers at the NETBIOS level. According to the invention, the upper levels (i.e., the protocol stacks and the transport layer) have no knowledge of the connection at the hardware level. In particular, every data packet to be transmitted from the local processing system in response to the access request is sent from the service program down to the hardware level with just an address identifying the original source of the request (i.e., the external processing system device). If the address does not identify an existing connection, the connection is established automatically. If the address does identify an existing connection, the connection identifier for the existing connection is retrieved and the packet is transmitted on that number.

Figure 3:
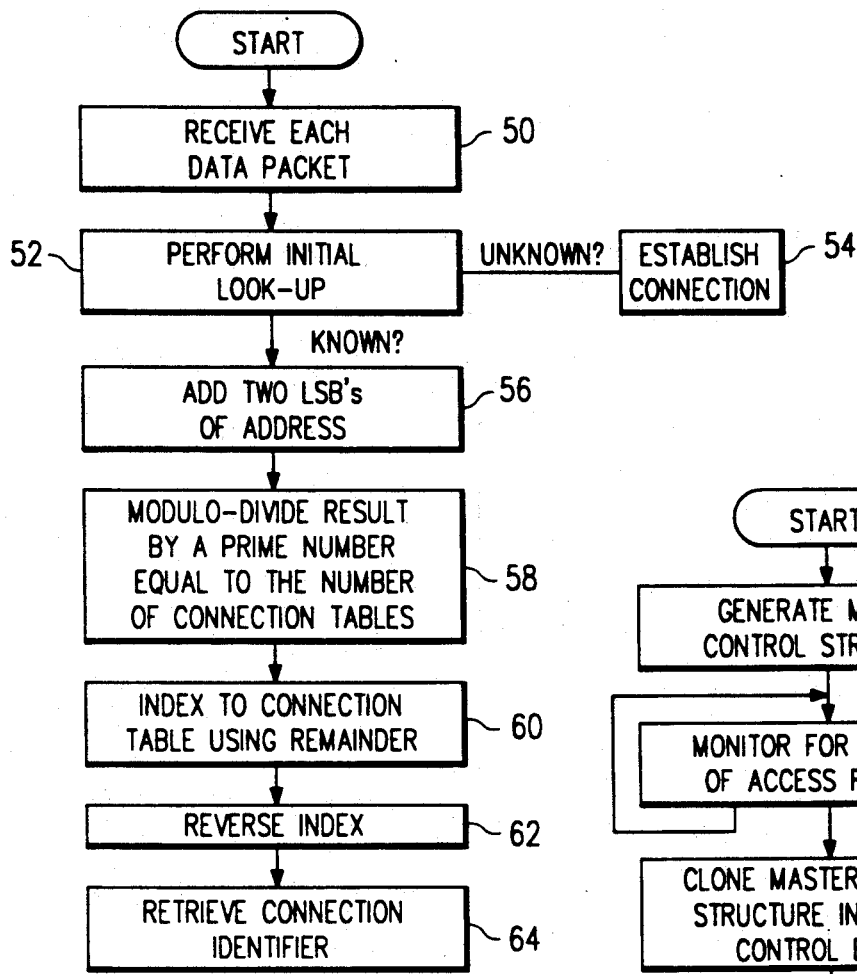
FIG. 3 is a flowchart diagram of a hash algorithm of the present invention for facilitating connection-oriented service at the hardware level of the local processing system of FIG. 1.

A unique hash algorithm is used to increase indexing speed to determine the connection identifiers for existing connections. Referring now to the flowchart of FIG. 3, this routine is now described. At the outset, the local processing system has associated therewith a plurality of "connection tables" each of which includes a plurality of addresses and connection identifiers. The tables are formed automatically as connection requests come in and as the system connects to other systems; i.e., upon establishment of connections. The routine begins at step 50 upon receipt of each data packet including the routing address. At step 52, a test is made to determine if the address identifies a known connection. If not, the connection is established at step 54. If the result of the test at step 52 indicates that the address corresponds to an existing connection identifier, the routine continues at step 56 by adding together the two least significant bytes (LSB's) of the address. At step 58, the result of the addition step 56 is then modulo-divided by a prime number equal to the number of connection tables. The remainder generated from the modulus division is then used at step 60 as the index to one of the connection tables. Specifically, the remainder identifies the particular connection table.

Thereafter, at step 62, the routine indexes into the particular connection table (corresponding to the remainder) in a "backwards" manner, i.e., by using the least significant bytes of the address rather than the most significant bytes. In this manner, the location of the connection identifier takes place much more rapidly because many of the cards identified in a connection table will have common MSB's. Once the connection identifier is located, it is retrieved at step 64 and the packet is transmitted on that number.

Therefore, it can be seen that the invention provides automatic connections as well as automatic lookup of existing connections in the datalink layer. All data packet addresses are resolved into a connection identifier based on the hash index (i.e., the remainder) and the backwards indexing routine. This operation facilitates "connection-oriented" service at the hardware level.

Figure 4:
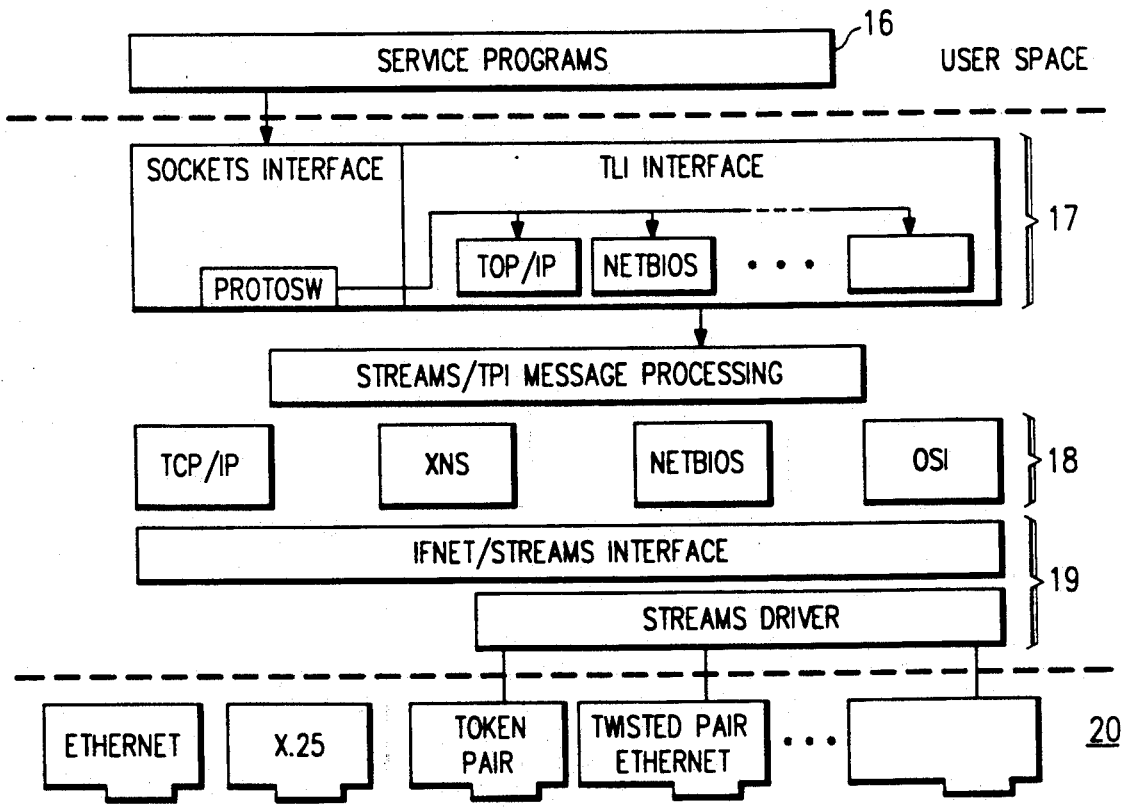
FIG. 4 is a schematic block diagram of an alternate embodiment of the invention wherein the local processing system includes common service interfaces for implementing UNIX and Berkeley Sockets function calls.

Referring now to FIG. 4, a schematic block diagram is shown of an alternate embodiment of the invention wherein the local processing system includes common service interfaces for implementing UNIX and Berkeley Sockets function calls. By way of background, a user level service program must communicate to a kernel level protocol stack via the service level interface layer 17 such as shown in FIG. 1. In UNIX System V, the interface is called "TLI" or the transport level interface. In Berkeley Standard Distribution (BSD) UNIX, the interface is a Berkeley-style Sockets interface. According to another important feature of the present invention, a dual "personality" interface layer is provided between the user service programs and the protocol stacks, and between the protocol stacks and the device drivers. Thus, if a service program is making Berkeley Sockets calls, for example, these calls are translated back into TLI-type calls, or vice versa. The same protocol stacks therefore can be used for service programs whether or not they are written in Berkeley BSD UNIX or UNIX System V STREAMS.

Referring now to FIG. 4, the preferred architecture is shown. The upper level dual interface 17 allows service programs to talk to the protocol stacks with both Sockets and STREAMS. Likewise, the lower level dual interface 19 has the ability to talk to two different types of drivers, Sockets-type and STREAMS-type drivers. If the local processing system is a BSD machine, the dual interface 19 generates Sockets-type direct hardware calls. If the system is a UNIX System V machine, the interface 19 generates STREAMS-type calls.

The upper layer dual interface 17 includes a Sockets interface layer 60 and a TLI interface 62 having a plurality of modules 62a-62d. For example, module 62a is a TCP/IP STREAMS module, and module 62B is a NETBIOS STREAMS module, and so forth for other modules normally comprising a TLI interface on a UNIX System V machine. The Sockets interface layer 60 includes a switch PROTOSW 64 which functions to select the proper module depending on the calls received from the service programs. If the calls are Berkeley Sockets, the Sockets interface layer 60 translates those calls into STREAMS-type calls and directs the calls, via the switch 64, to the appropriate module 62. If the calls from the service programs are in STREAMS, they are sent directly to the modules 62 without change. Likewise, the lower level dual interface layer 19 includes an Ifnet/STREAMS interface 68 and a STREAMS driver 70. Because BSD drivers generally deal with devices directly, the Ifnet/STREAMS interface can talk directly to the drivers interfacing, for example, to Ethernet and X.25. The STREAMS driver 70, however, is "virtual" in that it looks like a direct hardware driver but really is a software driver. The output of the driver 70 is one or more Berkeley style hardware device drivers.

The networking interfaces described above provide significant advantages. Most importantly, service programs written for the BSD environment can be compiled and run unmodified on a UNIX System V machine. Programs written for the TLI environment can be run unmodified because of the TLI interface. Because Berkeley Sockets is supported in the kernel, no kernel sources are modified. At the hardware level, the Ifnet layer has an extra driver for multiplexing to STREAMS drivers. Both Berkeley-style Ifnet drivers that talk directly to hardware as well as Ifnet drivers that talk to STREAMS are provided. Therefore, different network applications can access multiple protocols through a common dual personality interface supporting both BSD Sockets and AT&T UNIX System V STREAMS calls.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

I claim:

1. A method, using a local processing system having an operating system kernel and supporting multiple protocol stacks and multiple hardware device drivers, for enabling one or more external processing systems to access service programs of the local processing system, comprising the steps of:

(a) generating a master control structure for each compatible protocol stack and device driver supported in the local processing system, the master control structure for each protocol stack/device driver pair including control information to facilitate data transfer to and from the protocol stack associated with that protocol stack/device driver pair;

(b) monitoring the hardware device drivers for receipt, from an external processing system, of any requests to access the service programs;

(c) upon receipt by a protocol stack/device driver pair of an access request for one of the service programs, cloning the master control structure into a control structure (DCB) for that service program, the resulting service program control structure including control information to associate the service program with the protocol stack/device driver pair receiving the access request;

(d) creating a virtual circuit representing a communication path between the external processing system, the protocol stack/device driver pair receiving the access request, and the service program;

(e) generating a control block (NCB) for each predetermined block of actual data to be communicated to and from the service program, the control block including a data portion and information identifying the service program control structure for the service program;

(f) maintaining the service program control structure and the virtual circuit while actual data is communicated between the service program, the protocol stack/device driver pair and the external processing system, wherein during such data communication the data portion of each control block is transmitted over the virtual circuit; and (g) terminating the service program control structure and the virtual circuit upon completion of the data communication.

2. The method as described in claim 1 wherein the operating system kernel includes first or second service interfaces between the service programs and the protocol stacks.

3. The method as described in claim 1 wherein the control structure includes a virtual circuit identification number.

4. The method as described in claim 3 wherein the virtual circuit identification number identifies a virtual circuit control block including control information facilitate data transfer to and from the device driver uniquely identified with the virtual circuit.

5. The method as described in claim 4 further including the step of maintaining the virtual circuit control block while maintaining the data control block.

6. The method as described in claim 1 wherein the application programs interface to the protocol stacks via calls to a first or a second service interface in the kernel.

7. The method as described in claim 6, further including the step of:

translating calls to the first service interface into calls to the second service interface such that an application program written for the first service interface is compatible with the second service interface without change to the kernel or the application program.

8. The method as described in claim 3 wherein the first service interface is a Berkeley sockets style interface and the second service interface is an AT&T UNIX System V Streams transport layer interface (TLI).

9. The method as described in claim 1 wherein the operating system kernel is UNIX System V.

10. The method as described in claim 1 wherein the operating system kernel is Berkeley Sockets.

11. The method as described in claim 1 wherein one of the protocol stacks implements the NETBIOS protocol.

12. The method as described in claim 11 wherein one of the protocol stacks implements the TCP/IP protocol.

13. The method as described in claim 11 wherein one of the protocol stacks implements the XNS protocol.

14. The method as described in claim 1 wherein the protocol stacks implement the NETBIOS, TCP/IP and XNS protocols.

15. The method as described in claim 1 wherein one of the device drivers interface to Ethernet.

16. The method as described in claim 1 wherein one of the device drivers interfaces to a token passing ring.

17. The method as described in claim 1 wherein one of the device drivers interfaces to a token passing bus.

* * * * *